United States Patent
Vrijma

[15] 3,664,219
[45] May 23, 1972

[54] APPARATUS FOR CUTTING A BLOCK OF PLASTIC MATERIAL

[72] Inventor: Berend Vrijma, Vuren, Netherlands

[73] Assignee: Calsilox S.A., Luxemburg Ville, Luxembourg

[22] Filed: June 23, 1970

[21] Appl. No.: 49,050

[30] Foreign Application Priority Data

June 26, 1969 Netherlands..........................6909801

[52] U.S. Cl....................................83/89, 198/195, 83/145, 83/431, 425/232, 425/315, 425/307
[51] Int. Cl........................................B28b 7/14
[58] Field of Search ..........................25/105–108, 112–114, 25/DIG. 16; 198/179, 195, 199, 229, 230; 83/401, 404, 409

[56] References Cited

UNITED STATES PATENTS

| | | | |
|---|---|---|---|
| 3,088,186 | 5/1963 | Mennitt | 25/106 |
| 3,407,457 | 10/1966 | Blom | 25/105 X |
| 3,212,631 | 10/1965 | Thompson | 198/230 |
| 3,353,236 | 11/1967 | Stedman | 25/DIG. 16 |
| 3,197,530 | 7/1965 | Miller et al. | 25/112 |
| 707,275 | 8/1902 | Stimpson | 25/113 |

Primary Examiner—J. Spencer Overholser
Assistant Examiner—David S. Safran
Attorney—Sandoe, Hopgood and Calimafde

[57] ABSTRACT

Apparatus for cutting a block of material in a plastic state, more particularly light weight concrete, comprising a plurality of supports which extend transversely of a cutting direction and whose upper surfaces are formed with a plurality of projections; a plurality of rods extending in the cutting direction and loosely spaced out one beside the other between the projections, for carrying the block; and a number of cutting wires. The parts of the block disposed at a cutting wire width from one another cannot be pushed against one another, as is needed for cutting the parts of the block in a direction transverse of the cutting already performed, to prevent the tearing and crumbling of the parts of the block during the second cutting.

This apparatus is improved in that the supports adjoin one another, and the projections and the rods are substantially of the same height and cooperate to form a flat table.

11 Claims, 2 Drawing Figures

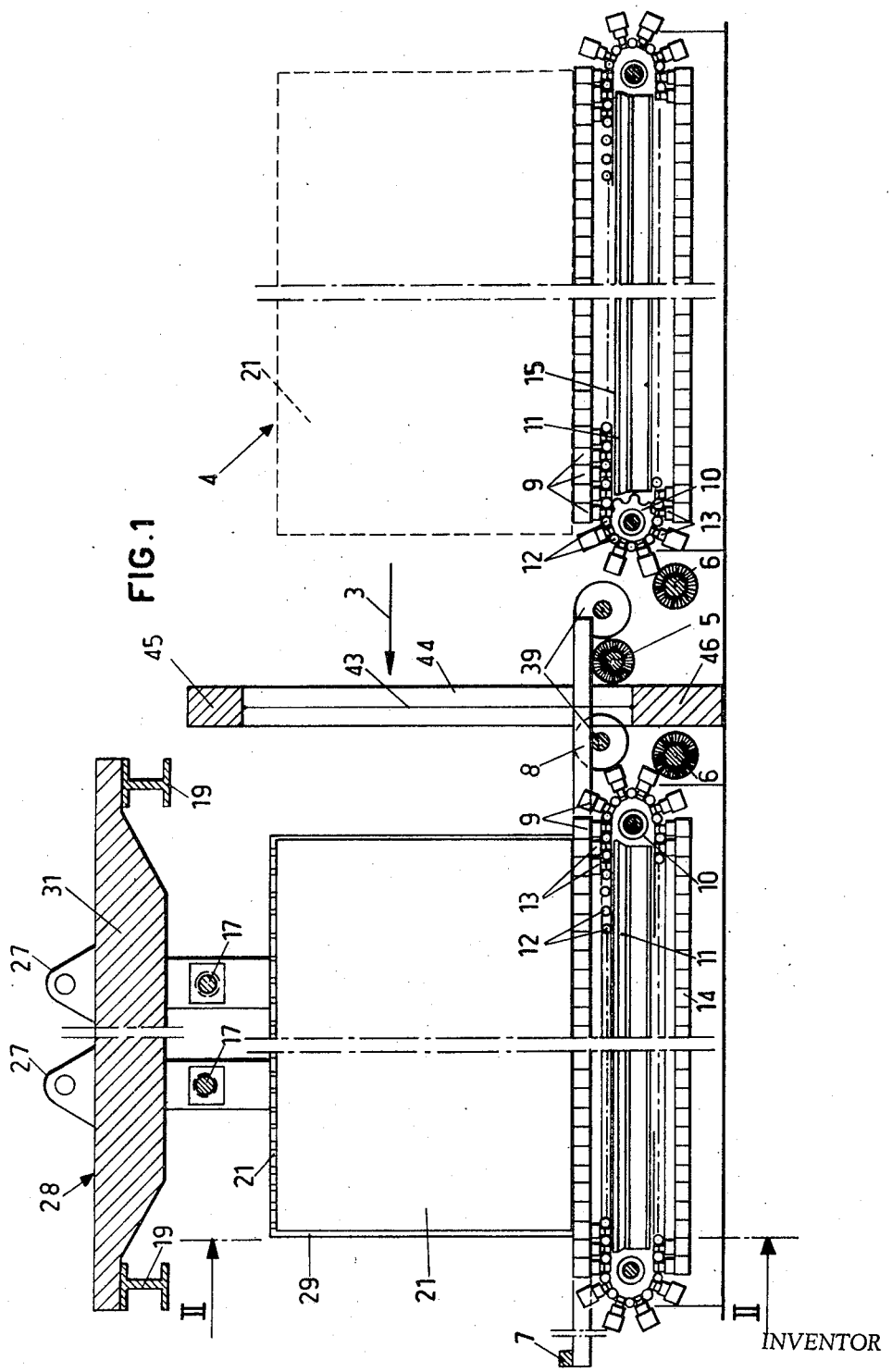

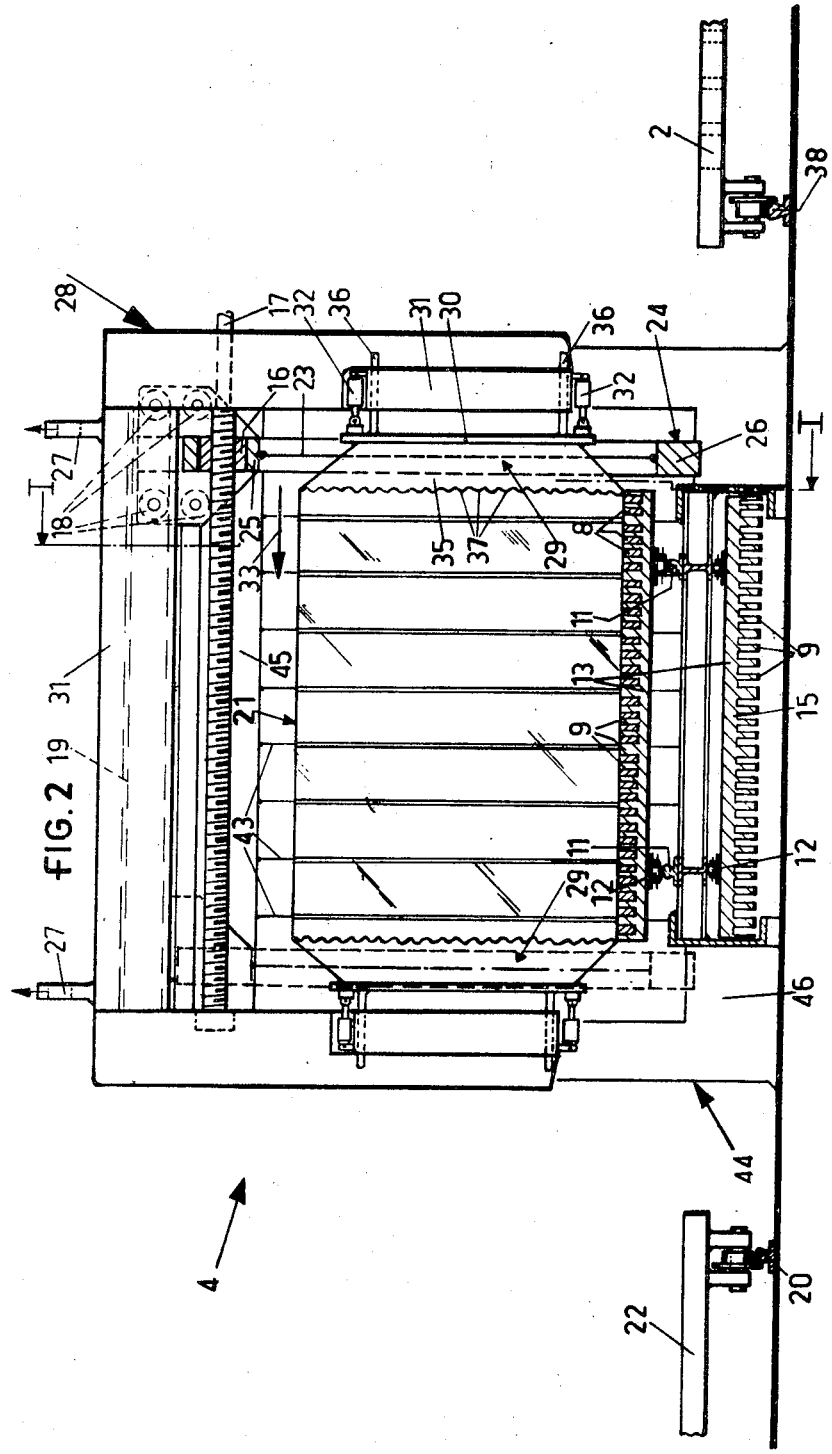

APPARATUS FOR CUTTING A BLOCK OF PLASTIC MATERIAL

The invention relates to an apparatus for cutting a block of material in a plastic state, more particularly light weight concrete, in at least one predetermined cutting direction, comprising a plurality of supports which extend transversely of the cutting direction and whose upper surfaces are formed with a plurality of projections; a plurality of rods extending in the cutting direction and loosely spaced one beside the other between the projections, for carrying the block; and a number of cutting wires each tensioned between a tensioning member above the rods and a tensioning member therebelow, the block carried by the rods being cut during a relative movement, guided parallelly with the cutting direction, between the rods on the one hand and the cutting wires on the other.

In a known apparatus of the kind specified, the rods are disposed at a distance from one another and form an interrupted table surface. Consequently, the parts of the block disposed at a cutting wire width from one another cannot be pushed or pressed against one another, as is needed for cutting the parts of the block in a direction transverse of the cutting already performed, to prevent the tearing and crumbling of the parts of the block during the second cutting. Moreover, it is important that parts of the block disposed at a cutting wire width from one another can be pushed in the direction of one another, so that the parts of the block can be removed together from the rods by means of a gripper having clamping jaws engaging the cut block transversely of the cutting direction.

The invention provides an apparatus of the kind specified in which the parts of the block can be pushed or pressed against one another without difficulty:

To this end, the apparatus according to the invention is characterized in that the supports adjoin one another and the projections and the rods are substantially of the same height or even with one another whereby to define a flat table or surface.

These and other features of the invention will be clearly gathered from the following description of a preferred embodiment of the apparatus according to the invention, with reference to the drawings, wherein:

FIG. 1 is a longitudinal direction, taken along the line I—I in figure 2, and

FIG. 2 is a cross-section, taken along the line II—II in figure 1.

A cutting device 4 for the longitudinal cutting of an oblong block 21 of light weight concrete in a plastic state comprises a number of vertical longitudinal cutting wires 43 which are tensioned between a top beam 45 and a bottom beam 46 of a cutting frame 44 at a first cutting station, and two endless chains 14, 15 driven in common and aligned on either side of the cutting frame 44 at the cutting station, said endless chains 15 and 14 comprising first and second assemblies, respectively, of hingeably interconnected supports 13 guided by rollers 12 disposed at their hinge axes over rails 11 and sprocket wheels 10. The supports 13 have distributed over their length projections 9 which are aligned in the direction indicated by arrow 3, and adjoin one another. Grooves or spaces are therefore formed between the projections 9 for receiving rods 8 interconnected at one end by a transverse rod 7 disposed thereon.

Adjacent the cutting frame or framework 44, grooved transverse rollers 39 support the rods 8, while rotating brushes 5, 6 mounted in the transverse direction clean the rods and the supports 13 respectively from plastic material sticking thereto.

Referring to figure 2, a block 21 is fed on a carriagelike bottom 22 of a casting mould, whose walls are removed, on one side of a cutting device 4 over rails 20 between a gripping and pressing means comprising clamping jaws 29 of a gripper 28. The clamping jaws 29 consist of a large number of vertical jaw members 30 each of which is guided by horizontal pins 36 in a U-shaped frame 31 of the gripper 28, and each of which is brought into a clamped condition by means of jacks 32. The clamping surfaces of the jaw members 30 are formed with projections 37 which penetrate into the plastic material of the block 21, and with vertical grooves 35 receiving vertical cutting wires 23, clamped between a top beam 25 and a bottom beam 26 of a cutting frame or framework 24 which is suspended by means of rollers 18 or rails 19 from the frame 31 and engages via nuts 16 with driven screwthreaded spindles 17. After the block 21, with the cutting frame constituting a second cutting station 24 displaced laterally, has been clamped tightly between the clamping jaws 29, the gripper 28 together with the block 21 is raised by means of raising means 27 engaging the frame 31 to above the bottom 22 and placed on an endless chain 15 comprising the first assembly of supports on which the rods 8 are disposed (cf. FIG. 1). When the gripper 28 has been opened, the chains 15, 14 are driven in common at an identical speed in the direction indicated by arrow 3, so that the rods 8, of which the transverse rod 7 is still disposed on the side of the cutting frame 44 (the delivery side) adjacent the chain 14, are moved together with the block 21 through the entry side of the cutting frame 44 of the first cutting station;, whose cutting wires 43 are disposed in longitudinal planes through the aligned projections 9. The longitudinally cut block, lying with the rods 8 on the chain 14 of the second assembly of supports, is then again seized by the gripper 28 (cf. FIG. 2). The portions 1 of the block which are at one cutting wire width from one another are pushed or pressed against one another transversely of the rods 8. This can be done, since the rods 8 and the projections 9 cooperate to form a flat table.

When the block 21, with the cutting frame 24 of the second cutting station in the position shown in solid lines, has been tightly clamped between the clamping jaws 29, the gripper 28 together with the block 21 is raised by means of raising means 27, so that the cutting frame 24 is disposed completely above the level of the rods 8. The screwthreaded spindles 17 are then driven in common to move in the cutting direction 33 into the position shown in chain lines, so that the block 21 is cut in the transverse direction. Lastly, the gripper 28 is brought downwards, and block 21 nearest the cutting device 4 is placed on a travelling grid 2 which conveys the block 21 over rails 38 to a hardening vessel.

Each portion of the cut block 21 is carried reliably, since the clamping jaws 29 are subdivided into a number of jaw members 30 pressed against the block 21 independently of one another by jacks 32.

I claim:

1. An apparatus for cutting a block of material such as lightweight concrete in a plastic state in at least one predetermined cutting direction which comprises,
    a first cutting station having an entry side for receiving a block to be cut and a delivery side from which the cut block is delivered,
    a first assembly of a plurality of supports extending transversely to the cutting direction for delivering a block to be cut to the cutting station,
        said supports having extending from the upper surfaces thereof a plurality of projections aligned in the cutting direction with spaces therebetween,
    said supports being moveable in the cutting direction,
    means for moving said supports in the cutting direction towards said cutting station,
    a plurality of block-carrying rods extending in the cutting direction and capable of movement therealong occupying the spaces between the aligned projections of said supports such that the top of the rods are substantially even with the top of the projections to provide a flat surface,
        said rods being moveably supported between the projections so as to carry the block through the cutting station,
    and a framework of spaced cutting wires located at the first cutting station,
        said cutting wires being held under tension between an upper tensioning member disposed above the rods and a lower tensioning member disposed below said rods, whereby the block is cut by said wires by the movement of said rods relative to and between the cutting wires.

2. The apparatus as in claim 1, wherein a second assembly of a plurality of moveable supports is provided at the delivery side of the cutting station similar to said first assembly, said supports also having extending from the top surfaces thereof projections aligned in the cutting direction with spaces therebetween along which said block-carrying rods are moved from the first assembly through the cutting station to the second assembly of supports.

3. The apparatus as in claim 2, wherein the supports of the first assembly are coupled to a driven belt having guide means cooperably associated therewith for guiding said supports to and from the entry side of said cutting station.

4. The apparatus as in claim 2, wherein the supports of the second assembly are coupled to a driven belt having guide means cooperably associated therewith for guiding said supports to and from the delivery side of said first cutting station.

5. The apparatus as in claim 2, wherein the supports of the first assembly of supports are coupled to a first endless driven belt disposed on the entry side of said first cutting station and wherein the second assembly of supports is coupled to a second endless driven belt disposed on the delivery side of said first cutting station, said belts having relatively the same driven speed.

6. The apparatus as in claim 1, wherein at least one roller guide means is provided adjacent the first cutting station for guiding said block-carrying rods through said cutting station.

7. The apparatus of claim 1, wherein a rotatable rod-cleaning brush is disposed adjacent said first cutting station and transversely to the cutting direction for cleaning said rods following cutting of a plastic block.

8. The apparatus as in claim 1, wherein a rotatable support-cleaning brush is disposed transversely to the cutting direction and in contactable relationship to said moveable supports, such that the supports are cleaned as they pass and contact said brush.

9. The apparatus as in claim 1, wherein a gripping and pressing means is provided for pressing portions of the cut block together in a direction transverse to the cutting direction following cutting of the block at the first cutting station.

10. The apparatus as in claim 9, wherein a second cutting station is provided including a framework of cutting wires for cutting the previously cut block in a direction transverse to the previous cutting direction.

11. The apparatus as in claim 9, wherein said gripping and pressing means has cooperably associated therewith a second cutting station comprising a framework of cutting wires mounted for relative movement transverse to the gripping and pressing means, whereby to effect cutting of a plastic block held by said means.

* * * * *